(12) United States Patent
Kons

(10) Patent No.: US 9,990,537 B2
(45) Date of Patent: Jun. 5, 2018

(54) FACIAL FEATURE LOCATION USING SYMMETRY LINE

(71) Applicant: International Business Machines Corporation, Armonk, NY (US)

(72) Inventor: Zvi Kons, Yokneam Ilit (IL)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 14/803,142

(22) Filed: Jul. 20, 2015

(65) Prior Publication Data

US 2017/0024607 A1 Jan. 26, 2017

(51) Int. Cl.
*G06K 9/00* (2006.01)
*G06T 7/68* (2017.01)

(52) U.S. Cl.
CPC ..... *G06K 9/00248* (2013.01); *G06K 9/00281* (2013.01); *G06T 7/68* (2017.01); *G06T 2207/30201* (2013.01)

(58) Field of Classification Search
CPC ........... G06K 9/00221; G06K 9/00228; G06K 9/00241; G06K 9/00248; G06K 9/00281; G06K 9/00899; G06K 9/00906; G06T 7/68; G06T 2207/30201
USPC ........................................................ 382/118
See application file for complete search history.

(56) References Cited

U.S. PATENT DOCUMENTS 5,859,921 A * 1/1999 Suzuki ............... G06K 9/00268
382/118
8,355,530 B2 1/2013 Park et al.
8,848,986 B2 9/2014 Cavallini
8,856,541 B1 10/2014 Chaudhury et al.
2007/0286490 A1* 12/2007 Danowitz .......... G06K 9/00234
382/195

(Continued)

FOREIGN PATENT DOCUMENTS

EP 0889438 A2 * 1/1999 ............... G06T 7/70

OTHER PUBLICATIONS

Ohyama, Wataru, et al. "Automatic detection of facial midline and its contributions to facial feature extraction." ELCVIA: electronic letters on computer vision and image analysis 6.3 (2007): 55-65.*

(Continued)

*Primary Examiner* — Chan Park
*Assistant Examiner* — Geoffrey E Summers
(74) *Attorney, Agent, or Firm* — Ziv Glazberg

(57) ABSTRACT

A method, system and product for locating facial features using symmetry line of the face. The method comprises: obtaining an image of a face of a subject; automatically detecting a symmetry line of the face, wherein the symmetry line intersects at least a mouth region of the face; and automatically locating a facial feature of the face using the symmetry line. Optionally, a rotation of the symmetry line is used to select a template, to rotate a template or to rotate the image. Optionally, the facial feature is symmetrical and the facial feature is searched for using a symmetrical template. Optionally, the automatic locating comprises performing a one dimension correlation of an intensity cross section defined by the symmetry line with a cross section template. Optionally, the automatic location comprises correlating a curve defined by the symmetry line with a template curve.

17 Claims, 4 Drawing Sheets

(56) References Cited

U.S. PATENT DOCUMENTS

2011/0075933 A1* 3/2011 Hong ................ G06K 9/00228
382/190
2013/0188840 A1 7/2013 Ma et al.
2014/0337948 A1 11/2014 Hoyos

OTHER PUBLICATIONS

Smith, Steven W. "The scientist and engineer's guide to digital signal processing." 2nd ed., 1999, pp. 136-140.*

Szeliski, Richard. "Computer Vision." 2011, pp. 337-338.*

Saber, Eli, and A. Murat Tekalp. "Frontal-view face detection and facial feature extraction using color, shape and symmetry based cost functions." Pattern Recognition Letters 19.8 (1998): 669-680.*

Singh et al., "Face Recognition with Liveness Detection using Eye and Mouth Movement", 2014 International Conference on Signal Propagation and Computer Technology (ICSPCT 2014), Jul. 2014, pp. 592-597.

Singh et al., "Face Recognition Using Facial Symmetry", Proceedings of the Second International Conference on Computational Science, Engineering and Information Technology, Oct. 2012, pp. 550-554.

Nalinakshi et al., "Liveness Detection Technique for Prevention of Spoof Attack in Face Recognition System", International Journal of Emerging Technology and Advanced Engineering, Dec. 2013, vol. 3, Issue 12.

Kahm et al., "2D face liveness detection: An overview", 2012 BIOSIG—Proceedings of the International Conference of Biometrics Special Interest Group (BIOSIG), Sep. 2012.

Chakraborty et al., "An Overview of Face Liveness Detection", International Journal on Information Theory (IJIT), Apr. 2014, pp. 11-25, vol. 3, No. 2.

Kollreider et al., "Real-Time Face Detection and Motion Analysis With Application in "Liveness" Assessment", Transactions on Information Forensics and Security, Sep. 2007, pp. 548-558, vol. 2, No. 3.

Bredin et al., "Detecting Replay Attacks in Audiovisual Identity Verification", 2006 IEEE International Conference on Acoustics Speech and Signal Processing Proceedings, May 2006, pp. I-621-I-624, vol. 5.

* cited by examiner

FACIAL FEATURE LOCATION USING SYMMETRY LINE

TECHNICAL FIELD

The present disclosure relates to image analysis in general, and to facial features identification, in particular.

BACKGROUND

In many image processing applications, identifying facial features of the subject may be desired. Currently, location of facial features require a search in four dimensions using local templates that match the target features. Such a search tends to be complex and prone to errors because it has to locate both (x, y) coordinates, scale parameter and rotation parameter.

Additionally, some templates are made to be rotation invariant. However, such templates are generally less selective and therefore can produce false detections.

BRIEF SUMMARY

One exemplary embodiment of the disclosed subject matter is a computer-implemented method comprising: obtaining an image of a face of a subject; automatically detecting a symmetry line of the face in the image, wherein the symmetry line intersects at least a mouth region of the face; and automatically locating a facial feature of the face using the symmetry line.

Another exemplary embodiment of the disclosed subject matter is a computerized apparatus having a processor, the processor being adapted to perform the steps of: obtaining an image of a face of a subject; automatically detecting a symmetry line of the face in the image, wherein the symmetry line intersects at least a mouth region of the face; and automatically locating a facial feature of the face using the symmetry line.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to implement a face feature location tool that can accurately and precisely identify a facial feature in an image of a face.

One technical solution is to detect a symmetry line of the face appearing in the image and detecting the face feature using the symmetry line.

In some exemplary embodiments, the angle of the symmetry line may be used to select a template to be used in searching for the face features. In some exemplary embodiments, the template may not be rotation invariant and instead be specific for a given rotation. The rotation angle of the symmetry line may be used to rotate a template or to select a template having a suitable rotation, thereby improving the accuracy of the process.

In some exemplary embodiments, a symmetry cross section, which may be defined using values across the symmetry line, may be used to search for facial features that are intersected by the symmetry line, such as the mouth or nose positions. The location may be performed by a one dimension correlation of the symmetry cross section with cross section templates, such as depicting lip and moth openings, the nose, the forehead, the chin, or the like.

In some exemplary embodiments, symmetric facial features, such as the eyes, may be located using the symmetry line. In some exemplary embodiments, detected facial features may be verified for properties relating to the symmetry line, such as an equal distance between each feature and the symmetry line, a line connecting the two features is perpendicular to the symmetry line, or the like.

In some other exemplary embodiments, the search for symmetrical features such as the eyes is done in unison at both sides of the symmetry line. Two corresponding templates are matched at opposite points over the symmetry line as if they were one symmetric template.

In some exemplary embodiments, the whole image can be rotated, translated and scaled as so to make the symmetry line vertical, centered and at certain length. Further processing or template matching steps can now assume to know that the image of the face is properly aligned.

One technical effect of the disclosed subject matter is in providing a relatively stable and accurate method of identifying facial features.

Another technical effect is reducing computational complexity of performing the facial feature detection, such as from a two-dimensional search to a single dimensional search.

Figure 1:
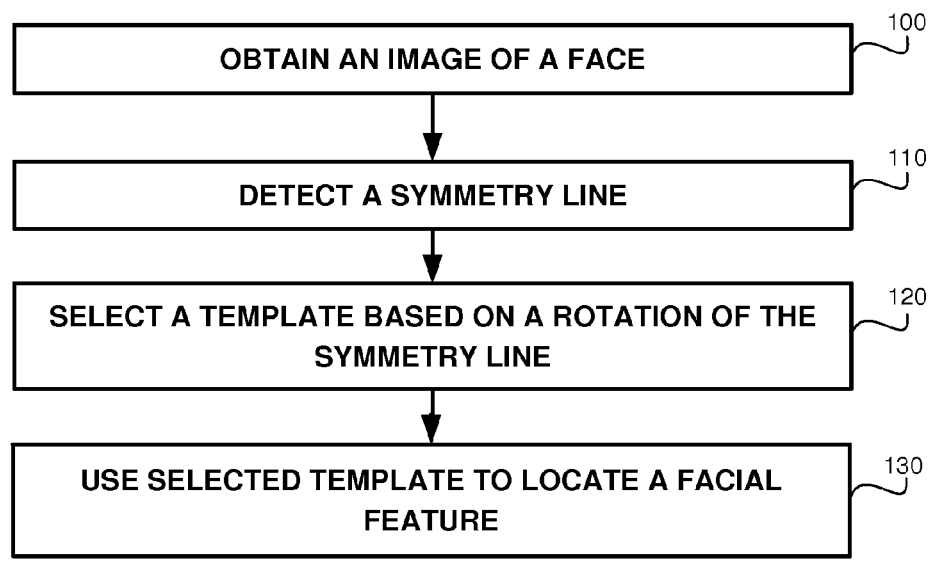
FIG. 1 shows a flowchart diagram of a method, in accordance with some exemplary embodiments of the disclosed subject matter.

Referring now to FIG. 1 showing a flowchart diagram of a method, in accordance with some exemplary embodiments of the subject matter.

In Step 100, an image of a face of a subject is obtained. In some exemplary embodiments, the image may be originally in grayscale, or processed into grayscale. Additionally or alternatively, the image may a color image.

In Step 110, a symmetry line of the face of the subject is detected. In some exemplary embodiments, a face detector may detect the face within the image. The symmetry line may be detected within the face.

Figure 3A:
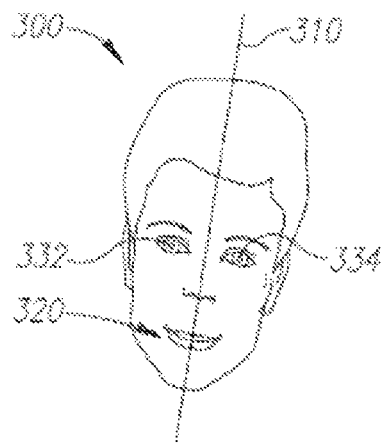
FIGS. 3A and 3B show illustrations of an image of a face, in accordance with some exemplary embodiments of the disclosed subject matter.
Figure 3B:
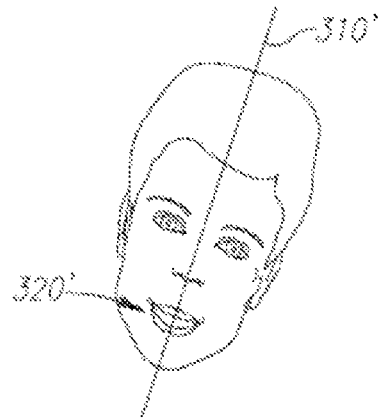

Referring now to FIG. 3A illustrating Symmetry Line 310 of Face 300. As can be appreciated, Symmetry Line 310 is tilted based on an angle of Face 300. Symmetry Line 310 crosses Mouth 320. In FIG. 3B, another image of the same subject is illustrated. Symmetry Line 310' crosses Mouth 320', which is open. As can be appreciated, each image has a different symmetry line, as a tilt angle (also referred to as a rotation angle) may be different in each image.

In some exemplary embodiments, a symmetry operator, S, may be defined as follows:

$$S(x, y, \theta) = \int_{(x_1, y_1) \in \Omega} |m(x_1, y_1) - m(x_2, y_2)|,$$

wherein m is an intensity value of the image in a point, wherein $(x_2, y_2)$ is a reflection of a point $(x_1, y_1)$ over a symmetry line, $\theta$ is an angle of the symmetry line, and $\Omega$ is half a circle with center at (x, y) and a radius in accordance with a size of the face. In some exemplary embodiments, the following define the reflection point: $x_2=x_1+2d \cos(\theta)$, $y_2=y_1-2d \sin(\theta)$, $d=-(x_1-x)\cos(\theta)+(y_1-y)\sin(\theta)$.

Figure 5:
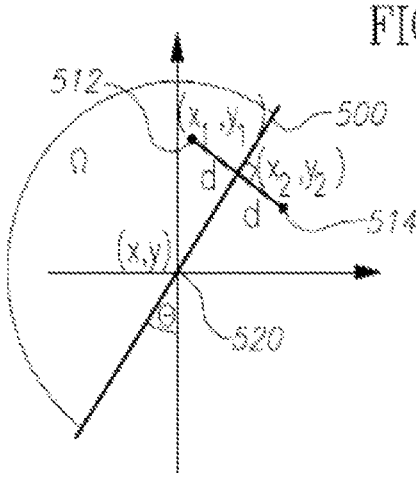
FIG. 5 illustrates the geometry of the symmetry operator, in accordance with the disclosed subject matter.

FIG. 5 illustrate the geometry of the symmetry operator. Symmetry Line 500 is tilted and angled at an angle of $\theta$. Symmetry Line 500 passes through Center 520 (x, y). A half circle having a Center 520 (x, y) and a radius in accordance with a size of a face of the subject (e.g., about the lateral radius of the face, 80% of the lateral radius of the face, 75% of the vertical radius of the face, or the like) is denoted as $\Omega$. Every point in $\Omega$ is reflected by Symmetry Line 500 and its corresponding point is expected to be substantially similar to the point (e.g., similar intensity values). As an example, Point 512 $(x_1, y_1)$ is reflected by Symmetry Line 500 to Point 514 $(x_2, y_2)$, each of which is at a distance of d from Symmetry Line 500.

In some exemplary embodiments, if the symmetry operator is applied with correct parameters (e.g., correct (x, y) and $\theta$) which match the symmetry line of the face in the image, the value returned is expected to be close to zero as image intensity of each point in $\Omega$ is expected to be similar to that of the reflected point which is reflected by the symmetry line.

In some exemplary embodiments, two points that are expected to be in opposite sides of the symmetry line may be selected (e.g., Points 512 and 514; denoted as $(x_R, y_R)$ and $(x_L, y_L)$). In some exemplary embodiments, the location of the two eyes can be used (e.g., 332 and 334 of FIG. 3A). A search may be performed between those two point and with various angles to find the minimal value of the symmetry operator. The results of such a search may be the parameters of the symmetry line. In some exemplary embodiments, the search may be formally defined as follows:

$$(x_s, y_s, \theta_s) = \underset{\alpha \in [0,1], \theta' \in [-\Pi/2, \Pi/2]}{\operatorname{argmin}} S(\alpha \cdot x_L + (1-\alpha) \cdot x_R, \alpha \cdot y_L + (1-\alpha) \cdot y_R, \theta').$$

In some exemplary embodiments, the symmetry line may be represented by the parametric equation:

$$\begin{pmatrix} x \\ y \end{pmatrix} = \begin{pmatrix} x_s \\ y_s \end{pmatrix} + \begin{pmatrix} \sin\theta_s \\ \cos\theta_s \end{pmatrix} t.$$

In some exemplary embodiments, the symmetry line may be used to extract image intensity cross section along the symmetry line: $v(t)=m(x_s+t\cdot\sin(\theta_s), y_s+t\cdot\cos(\theta_s))$, where t is a value within the upper and lower face boundaries.

Referring back to FIG. 1. In Step 120, a template to be used for locating the desired facial feature is selected. The template may be a rotation dependent template, whose rotation parameter is the tilt angle of the symmetry line. Additionally or alternatively, a template may be rotated to the desired tilt angle. In some exemplary embodiments, the selection is made from a database retaining different templates, each associated with a different angle. In some exemplary embodiments, there may be a single template that can be rotated to a desired angle and the rotation of the template to the desired angle is considered as a "selection".

In Step 130, the selected template is used for locating the desired facial feature.

Figure 2A:
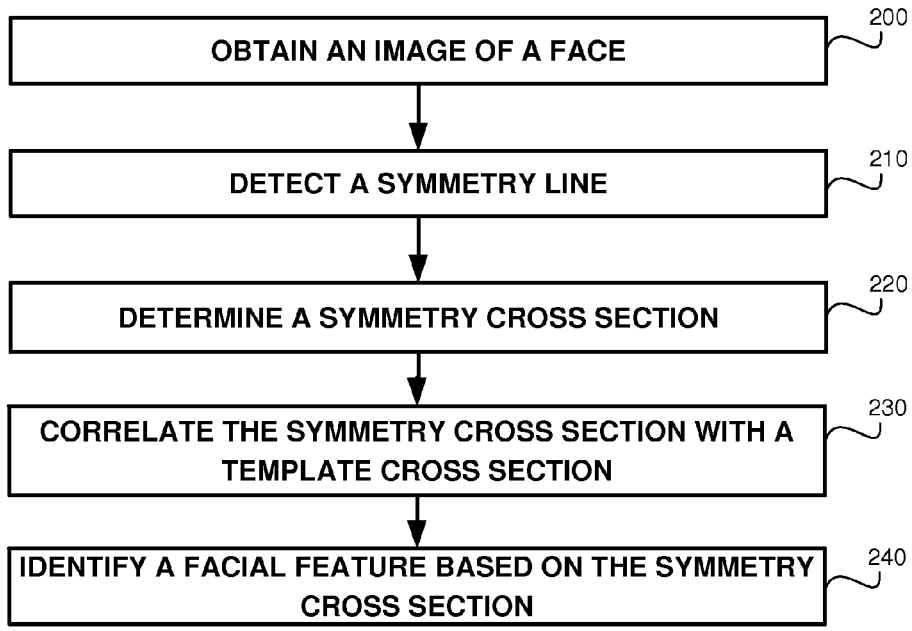
FIG. 2A shows a flowchart diagram of a method, in accordance with some exemplary embodiments of the disclosed subject matter.

Referring now to FIG. 2A showing a flowchart diagram of a method, in accordance with some exemplary embodiments of the subject matter.

In Step 200, an image of a face is obtained.

In Step 210, a symmetry line of the face is detected.

In Step 220, a symmetry cross section is determined based on the symmetry line. In some exemplary embodiments, the symmetry line may be used to extract a symmetry cross section along the symmetry line: $v(t)=m(x_s+t\cdot\sin(\theta_s), y_s+t\cdot\cos(\theta_s))$, where t is a value within the upper and lower face boundaries. In some exemplary embodiments, the image may be a grayscale image for which the value at m(x, y) is an intensity value and the symmetry cross section is an intensity cross section. Additionally or alternatively, colored images may be used with a vector of values in each pixel (e.g., m(x, y) comprising RGB values).

In Step 230, the symmetry cross section may be correlated with a cross section template. The cross section template may include sections which are a-priori known to be attributable to specific facial features. The correlation may be performed based on static facial feature which tend to maintain a static size and position, such as a nose, a forehead and not a mouth or a chin.

Figure 4A:
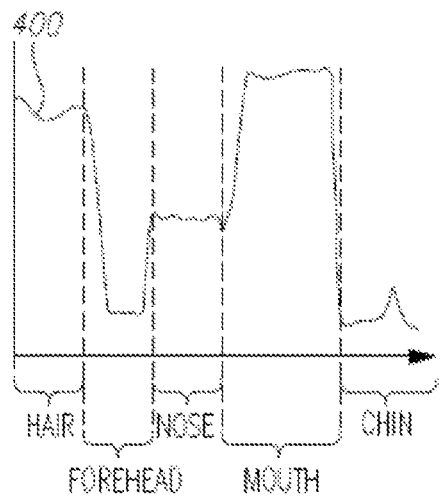
FIGS. 4A and 4B show an illustration of an intensity curve along the symmetry lines of FIGS. 3A and 3B, in accordance with the disclosed subject matter.
Figure 4B:
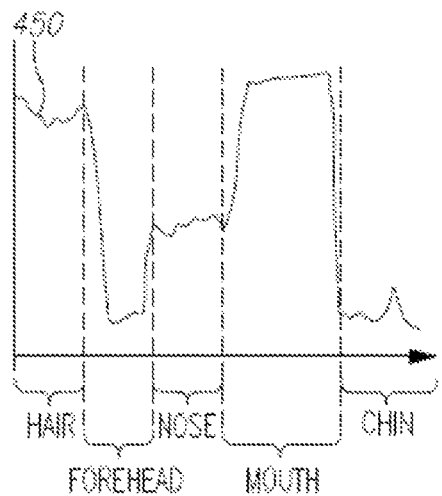

In some exemplary embodiments, the symmetry cross section may be aligned with the cross section template. In some exemplary embodiments, the symmetry line around static face landmarks may be relatively constant and similar in different images of the subject. For example, referring to FIGS. 4A and 4B, Intensity Curve 400 and Intensity Curve 450 may depict the intensity value at the Symmetry Lines 310 and 310', respectively. As can be appreciated from the figures, different sections of the curves relate to different areas of the face, such as hair, forehead, nose, mouth and chin In some exemplary embodiments, some face landmarks remain relatively constant, such as hair, forehead and nose, while others may change depending from one picture to another, such as the mouth and chin In some exemplary embodiments, it may be expected that the intensity levels from the area of the forehead and the nose may be similar in both images. Such information may be used to align one cross section based on the other. The alignment may compensate for scale changes, translation, or the like.

In some exemplary embodiments, alignment may be performed by solving the following:

$$(\alpha_s, \beta_s) = \underset{\alpha,\beta}{\operatorname{argmin}} \left( \int_{t \in r_U} |v_1(t) - v_2(\alpha \cdot t + \beta)| dt \right),$$

where α and β are scale and translation parameters, respectively, and the alignment is performed over $r_U$ which includes the expected range of the static landmarks (e.g., face and nose; for example ⅔ of the image intensity cross section). The aligned symmetry cross section may be represented by a modified function: $v'(t)=v(\alpha_s \cdot t+\beta_s)$.

In Step 240, the facial feature may be identified based on the symmetry cross section. Referring again to FIGS. 4A and 4B. In one example Curve 400 is the symmetry cross section and the attribution of different portions thereof to facial features may not be known. Curve 450 may be a cross section template for which at least the desired facial feature is a-priori identified. For example, in Curve 450 "hair", "forehead", "nose", "mouth" and "chin" features are a-priori attributed to separate portions of Curve 450. By correlating Curve 400 with Curve 450, sections of Curve 400 may be attributed to the "hair", "forehead", "nose", "mouth" and "chin" features.

Figure 2B:
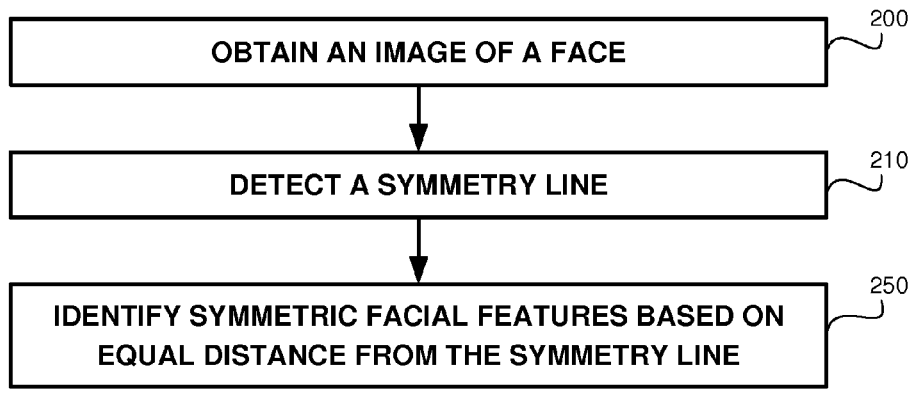
FIG. 2B shows a flowchart diagram of a method, in accordance with some exemplary embodiments of the disclosed subject matter.

Referring now to FIG. 2B showing a flowchart diagram of a method, in accordance with some exemplary embodiments of the subject matter. In Step 250, after a symmetry line is detected (210), symmetric facial features are identified. The identification may be performed using the symmetry line as a reference object.

As an example, consider a situation in which the eyes are to be identified. In traditional algorithms, mistakes can happen when locating the eyes because of various artifacts such as eye glasses and light reflections. By using the properties of the symmetry line, incorrect eye positions may be avoided. In some cases, one or more of the requirements that are related to the symmetry line may be enforced when searching for the eye features. As an example, a line connecting the two symmetric features is expected to be perpendicular to the symmetry line. In some cases, the angle of the above-mentioned line is expected to be θ+90°. As another example, a distance between each eye and the symmetry line is expected to be equal as the eyes are expected to appear in symmetric locations.

Figure 6:
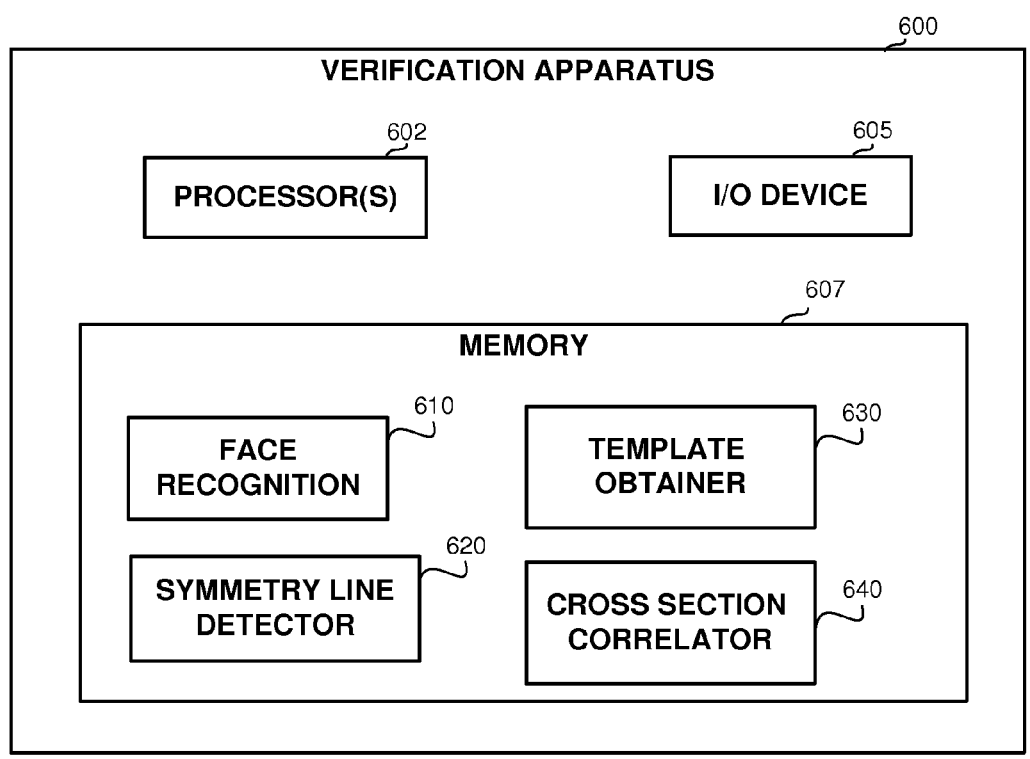
FIG. 6 shows a block diagram of an apparatus, in accordance with some exemplary embodiments of the disclosed subject matter.

Referring now to FIG. 6 showing a block diagram of an apparatus, in accordance with some exemplary embodiments of the disclosed subject matter.

An Apparatus 600 may be configured to provide for biometric verification and, in accordance with the disclosed subject matter. In some exemplary embodiments, Apparatus 600 may be a mobile computing device, such as a personal computer, a server, a smartphone, a Personal Digital Assistant (PDA), or the like.

In some exemplary embodiments, Apparatus 600 may comprise one or more processor(s) 602. Processor 602 may be a Central Processing Unit (CPU), a microprocessor, an electronic circuit, an Integrated Circuit (IC) or the like. Processor 602 may be utilized to perform computations required by Apparatus 600 or any of it subcomponents.

In some exemplary embodiments of the disclosed subject matter, Apparatus 600 may comprise an Input/Output (I/O) Module 605. I/O Module 605 may be utilized to receive images which are captured by a camera (not shown), audio recordings captured by a microphone (not shown), or the like. I/O Module 605 may be used to provide output indicating successful or unsuccessful verification attempt. In some exemplary embodiments, I/O Module 605 may be configured to alert when a spoof attempt is detected by Liveness Detector 630.

In some exemplary embodiments, Apparatus 600 may comprise a Memory 607. Memory 607 may be a hard disk drive, a Flash disk, a Random Access Memory (RAM), a memory chip, or the like. In some exemplary embodiments, Memory 607 may retain program code operative to cause Processor(s) 602 to perform acts associated with any of the subcomponents of Apparatus 600.

In some exemplary embodiments, a Face Recognition Unit 610 which is configured to analyze an image and determine facial features in a face of a subject appearing in the image. In some exemplary embodiments, Face Recognition Unit 610 may analyze images obtained by I/O Module 605.

In some exemplary embodiments, Face Recognition Unit 610 may utilize a Symmetry Line Detector 320 to detect a symmetry line of a face in an image. The symmetry line may be used by Face Recognition Unit 610 to identify the target facial features.

In some exemplary embodiments, Template Obtainer 630 may obtain a template based on the symmetry line detected by Symmetry Line Detector 320. The template may be a template to be used in searching for a face feature. Additionally or alternatively, the template may be a cross section template. The template may be obtained from a data storage, such as Memory 607, local storage, external storage, remote storage, or the like.

Cross Section Corelator 640 may be configured to correlate a symmetry cross section with a cross section template. Corelator 640 may be configured to align the symmetry cross section using the cross section template and to correlate a portion of the cross section template which is a-priori attributed to a target facial feature with a corresponding portion in the symmetry cross section. The corresponding portion may be deemed as including the target facial feature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:
1. A computer-implemented method comprising:
  obtaining an image of a face of a subject;
  automatically detecting a symmetry line of the face in the image, wherein the symmetry line intersects at least a mouth region of the face, wherein the symmetry line is a non-vertical line that is tilted by an angle, wherein said automatically detecting comprises:
    obtaining a pair of points; and
    minimizing a value of a symmetry operator to determine parameters of the symmetry line, wherein a value of the symmetry operator depends on the angle and a center point, wherein said minimizing is performed with respect to a variety of potential points as the center point, wherein the variety of potential points are points in between a first point of the pair of points and a second point of the pair of points; and automatically locating a facial feature of the face using the symmetry line, wherein said automatically detecting the symmetry line comprises: computing a value of the symmetry operator $S(x, y, \theta) = \int_{(x_1,y_1)\in\Omega} |m(x_1, y_1) - m(x_2, y_2)|$, wherein m is an intensity value of the image in a point, wherein $(x_2, y_2)$ is a reflection of a point $(x_1, y_1)$ over the symmetry line, wherein $\theta$ is the angle, wherein $(x_2, y_2)$ is determined based on $(x_1, y_1)$ using $\theta$, and wherein $\Omega$ is half a circle with center at $(x, y)$ and a radius in accordance with a size of the face.

2. The computer-implemented method of claim 1,
wherein said detecting the symmetry line comprises determining a rotation value of the symmetry line; and
wherein said automatically locating comprises: setting a rotation of a template based on the rotation value.

3. The computer-implemented method of claim 1,
wherein the facial feature comprises two eyes of the subject; and
wherein said automatically locating comprises: searching for the two eyes based on an angle of a line connecting the two eyes being perpendicular to the symmetry line.

4. The computer-implemented method of claim 1,
wherein the facial feature is symmetrical; and
wherein said automatically locating comprises: searching for the facial feature using a symmetrical template that is rotated and centered with accordance to the symmetry line.

5. The computer-implemented method of claim 1, wherein said automatically locating comprises:
defining a curve based on values of the image at the symmetry line;
correlating the curve with a template curve, wherein the template curve comprises a section attributable to the facial feature; and
determining the location of the facial feature of the face as the location in the curve that correlates to the section attributable to the facial feature in the template.

6. The computer-implemented method of claim 5, wherein the facial feature is a feature that is intersected by the symmetry line.

7. The computer-implemented method of claim 5, wherein the facial feature is selected from the group consisting of: a mouth and a lip.

8. The computer-implemented method of claim 5, wherein said correlating comprises performing a linear transformation on the curve, wherein the linear transformation is configured to compensate for translation and scale changes.

9. The computer-implemented method of claim 1, wherein said automatically locating comprises performing a one dimension correlation of an intensity cross section defined by the symmetry line with a cross section template.

10. The computer-implemented method of claim 1, wherein the image is in grayscale, wherein a value of an image at the symmetry line is an intensity value.

11. The computer-implemented method of claim 1, wherein the image is rotated and centered using an angle and a position of the symmetry line prior to said automatically locating.

12. A computerized apparatus having a processor, the processor being adapted to perform steps of:
obtaining an image of a face of a subject;
automatically detecting a symmetry line of the face in the image, wherein the symmetry line intersects at least a mouth region of the face, wherein the symmetry line is a non-vertical line that is tilted by an angle, wherein said automatically detecting comprises:
obtaining a pair of points; and
minimizing a value of a symmetry operator to determine parameters of the symmetry line wherein a value of the symmetry operator depends on the angle and a center point, wherein said minimizing is performed with respect to a variety of potential points as the center point, wherein the variety of potential points are points in between a first point of the pair of points and a second point of the pair of points; and
automatically locating a facial feature of the face using the symmetry line, wherein said automatically detecting the symmetry line comprises: computing a value of the symmetry operator $S(x, y, \theta) = \int_{(x_1,y_1)\in\Omega} |m(x_1, y_1) - m(x_2, y_2)|$, wherein m is an intensity value of the image in a point, wherein $(x_2, y_2)$ is a reflection of a point $(x_1, y_1)$ over the symmetry line, wherein $\theta$ is the angle, wherein $(x_2, y_2)$ is determined based on $(x_1, y_1)$ using $\theta$, and wherein $\Omega$ is half a circle with center at $(x, y)$ and a radius in accordance with a size of the face.

13. The computerized apparatus of claim 12,
wherein said detecting the symmetry line comprises determining a rotation value of the symmetry line; and
wherein said automatically locating comprises: setting a rotation of a template based on the rotation value.

14. The computerized apparatus of claim 12,
wherein the facial feature comprises two eyes of the subject; and
wherein said automatically locating comprises: searching for the two eyes based on an angle of a line connecting the two eyes being perpendicular to the symmetry line.

15. The computerized apparatus of claim 12,
wherein the facial feature is symmetrical; and
wherein said automatically locating comprises: searching for the facial feature using a symmetrical template that is rotated and centered with accordance to the symmetry line.

16. The computerized apparatus of claim 12, wherein said automatically locating comprises:
defining a curve based on values of the image at the symmetry line;
correlating the curve with a template curve, wherein the template curve comprises a section attributable to the facial feature; and
determining the location of the facial feature of the face as the location in the curve that correlates to the section attributable to the facial feature in the template.

17. The computerized apparatus of claim 12, wherein said automatically locating comprises performing a one dimension correlation of an intensity cross section defined by the symmetry line with a cross section template.

* * * * *